(12) United States Patent
Wen et al.

(10) Patent No.: US 11,163,332 B2
(45) Date of Patent: Nov. 2, 2021

(54) PORTABLE ELECTRONIC DEVICE

(71) Applicant: Acer Incorporated, New Taipei (TW)

(72) Inventors: Chun-Hung Wen, New Taipei (TW); Chun-Hsien Chen, New Taipei (TW); Wei-Chang Chen, New Taipei (TW); Yen-Chou Chueh, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/827,718

(22) Filed: Mar. 24, 2020

(65) Prior Publication Data

US 2021/0055761 A1 Feb. 25, 2021

(30) Foreign Application Priority Data

Aug. 20, 2019 (TW) .................................. 108129615

(51) Int. Cl.
*G06F 1/16* (2006.01)
(52) U.S. Cl.
CPC .......... *G06F 1/1624* (2013.01); *G06F 1/1662* (2013.01)
(58) Field of Classification Search
CPC .... G06F 1/1624; G06F 1/1662; G06F 1/1664; G06F 1/1666; G06F 1/1671; G06F 1/1675; H04M 1/0235; H04M 1/0237
See application file for complete search history.

(56) References Cited

U.S. PATENT DOCUMENTS

| | | | | | |
|---|---|---|---|---|---|
| 5,267,127 | A | * | 11/1993 | Pollitt | B41J 5/105 341/20 |
| 5,588,759 | A | * | 12/1996 | Cloud | B41J 5/10 361/679.13 |
| 5,635,928 | A | * | 6/1997 | Takagi | G06F 1/1616 341/22 |
| 5,769,551 | A | * | 6/1998 | Tsai | G06F 1/1622 361/679.14 |
| 5,774,384 | A | * | 6/1998 | Okaya | G06F 1/1616 341/22 |
| 6,078,495 | A | * | 6/2000 | Cipolla | G06F 1/203 361/679.46 |
| 6,314,274 | B1 | * | 11/2001 | Kumagai | H04M 1/0214 361/679.13 |
| 8,446,712 | B2 | | 5/2013 | Lee et al. | |
| 8,929,061 | B2 | | 1/2015 | Liao | |
| 10,506,739 | B2 | * | 12/2019 | Lee | G06F 1/1624 |
| 2005/0078443 | A1 | * | 4/2005 | Lee | G06F 1/1686 361/679.11 |
| 2006/0125796 | A1 | * | 6/2006 | Utz | G06F 1/1666 345/168 |

(Continued)

FOREIGN PATENT DOCUMENTS

TW M433062 7/2012
TW 201314461 4/2013

*Primary Examiner* — Adrian S Wilson
(74) *Attorney, Agent, or Firm* — JCIPRNET (57) ABSTRACT

A portable electronic device includes a first body, a second body, and a sliding mechanism. The first body includes a base and an input module slidably disposed on the base. The second body is pivotally connected to the base of the first body. The sliding mechanism includes a power output assembly and a rack, wherein the power output assembly is mounted at the base and the rack is mounted at the input module. The power output assembly is coupled to the rack.

9 Claims, 6 Drawing Sheets

(56) References Cited

U.S. PATENT DOCUMENTS

| | | | |
|---|---|---|---|
| 2007/0285343 A1* | 12/2007 | Han | G06F 1/1637 |
| | | | 345/1.3 |
| 2008/0144265 A1* | 6/2008 | Aoki | H04M 1/0268 |
| | | | 361/679.04 |
| 2009/0195507 A1* | 8/2009 | Fujino | G06F 3/0202 |
| | | | 345/168 |
| 2010/0321872 A1* | 12/2010 | Sip | H01H 13/807 |
| | | | 361/679.2 |
| 2013/0036846 A1* | 2/2013 | Griffin | H04M 1/0216 |
| | | | 74/37 |
| 2015/0092330 A1* | 4/2015 | Kershek | G06F 1/1666 |
| | | | 361/679.09 |
| 2015/0208016 A1* | 7/2015 | Rymer | G06F 1/1601 |
| | | | 348/333.06 |
| 2020/0033913 A1* | 1/2020 | Yang | G06F 1/1624 |

* cited by examiner

PORTABLE ELECTRONIC DEVICE

CROSS-REFERENCE TO RELATED APPLICATION

This application claims the priority benefit of Taiwan application serial no. 108129615, filed on Aug. 20, 2019. The entirety of the above-mentioned patent application is hereby incorporated by reference herein and made a part of this specification.

BACKGROUND

Technical Field

The disclosure relates to an electronic device, and in particular, to a portable electronic device.

Description of Related Art

A portable electronic device gradually becomes an indispensable tool for modernists due to the characteristics of portability and real-time transceiving and processing of information. Common portable electronic devices include notebook computers, tablet computers, and smartphones. Through comparing among notebook computers, tablet computers, and smartphones, it can be seen that notebook computers exhibit favorable characteristics such as high operation efficiency and multiplexing. Notebook computers, therefore, are popular among business persons, independent creators, game players, engineering personnel, research workers, or academic personnel.

An input module of a common notebook computer is a keyboard assembly and a touch pad, and the position of the input module on a body is fixed. In other words, the common notebook computer provides a single operation mode but lacks sufficient operational flexibility.

SUMMARY

The disclosure provides a portable electronic device featuring favorable operational flexibility.

The disclosure provides a portable electronic device including a portable electronic device body including a first body, a second body, and a sliding mechanism. The first body includes a base and an input module slidably disposed on the base. The second body is pivotally connected to the base of the first body. The sliding mechanism includes a power output assembly and a rack. The power output assembly is mounted at the base, and the rack are mounted at the input module. The power output assembly is coupled to the rack.

Based on the above, the position of the input module of the portable electronic device provided by the disclosure on the base can be automatically adjusted, so that different operation modes are provided for a user. Therefore, the portable electronic device provided by the disclosure features favorable operational flexibility.

In order to make the aforementioned and other objectives and advantages of the disclosure comprehensible, embodiments accompanied with figures are described in detail below.

DESCRIPTION OF THE EMBODIMENTS

Figure 1:
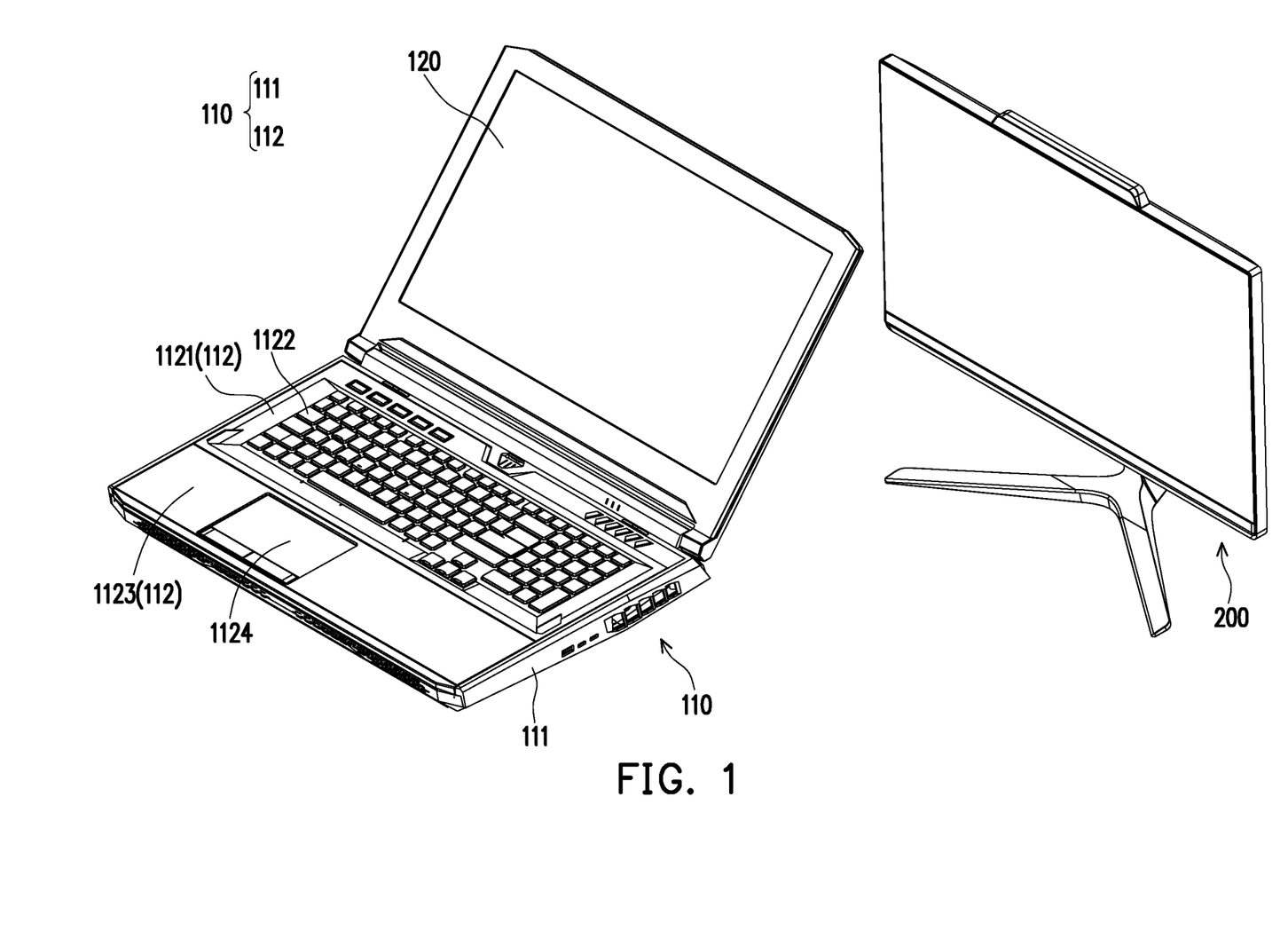
FIG. 1 is a schematic view of a portable electronic device in a first operation mode according to one embodiment of the disclosure.
Figure 2:
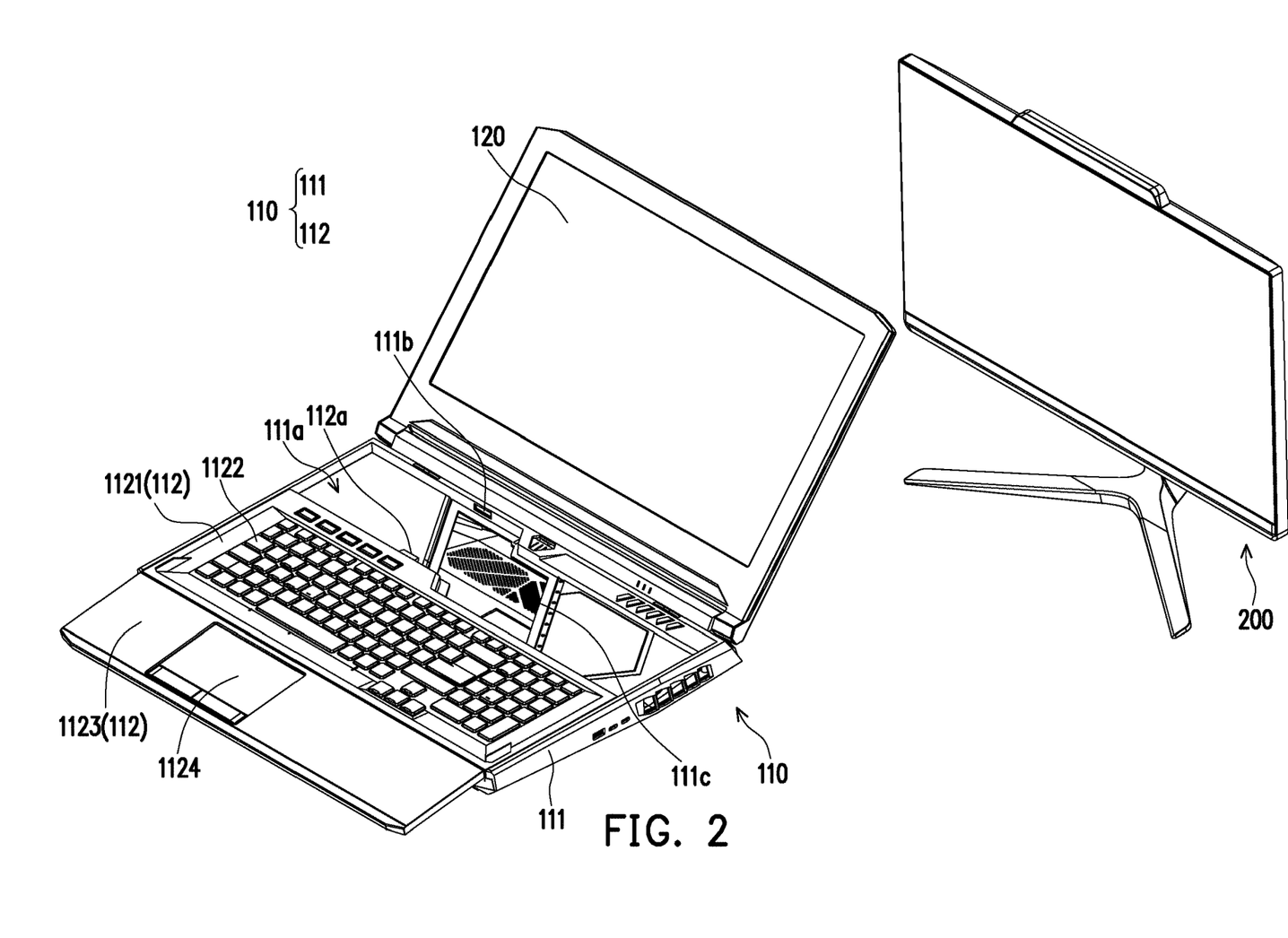
FIG. 2 is a schematic view of the portable electronic device in a second operation mode according to one embodiment of the disclosure.
Figure 3:
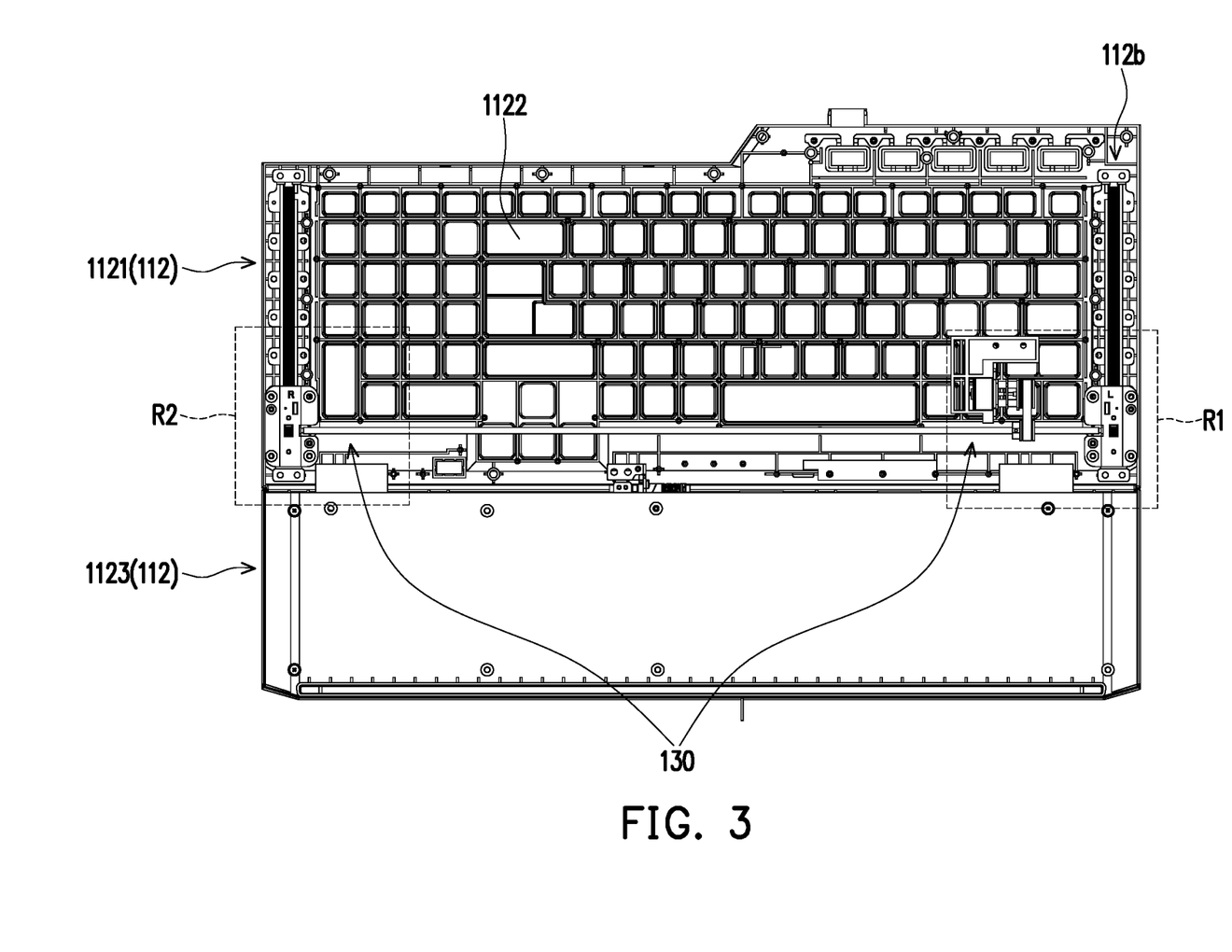
FIG. 3 is a schematic bottom view of an input module and a sliding mechanism in FIG. 1.
Figure 4:
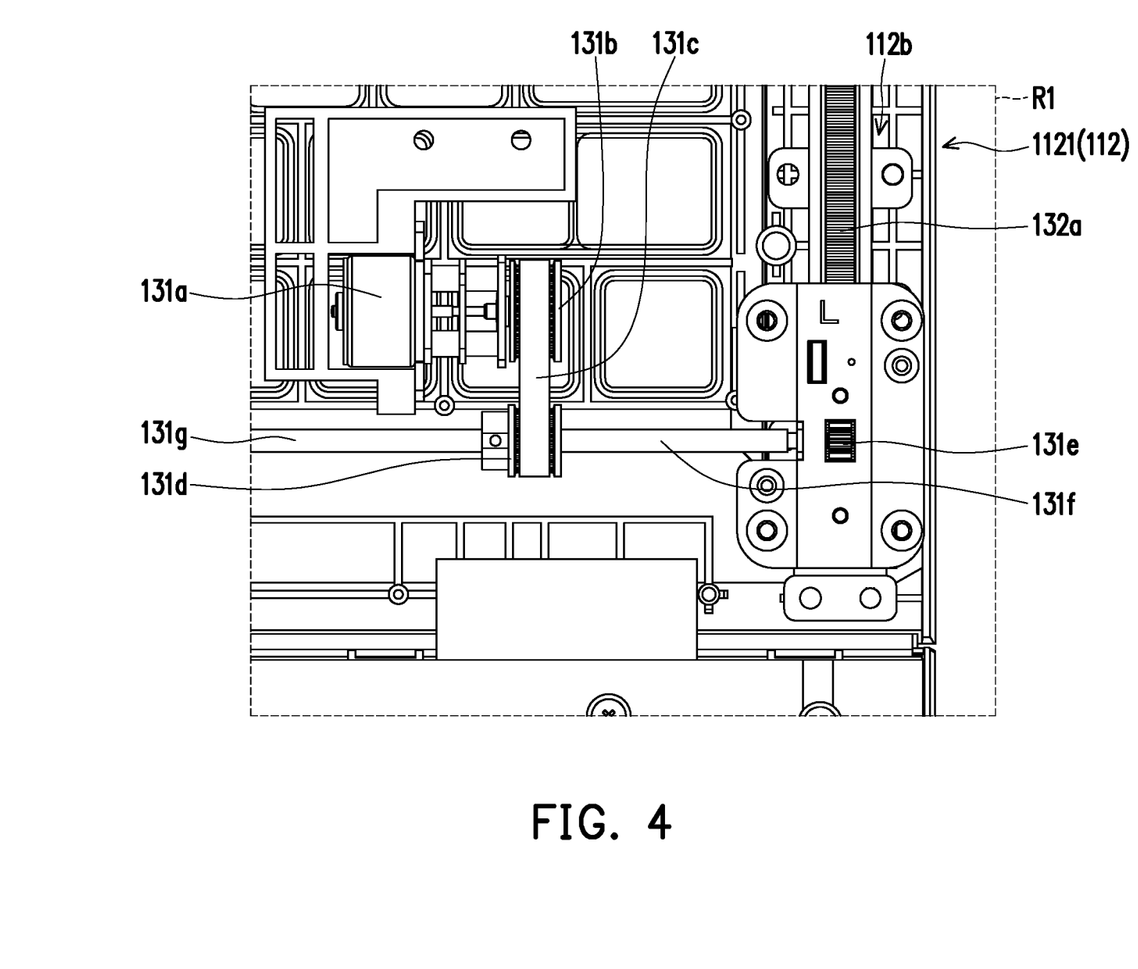
FIG. 4 and FIG. 5 are schematic partial enlarged views of regions R1 and R2 in FIG. 3.
Figure 5:
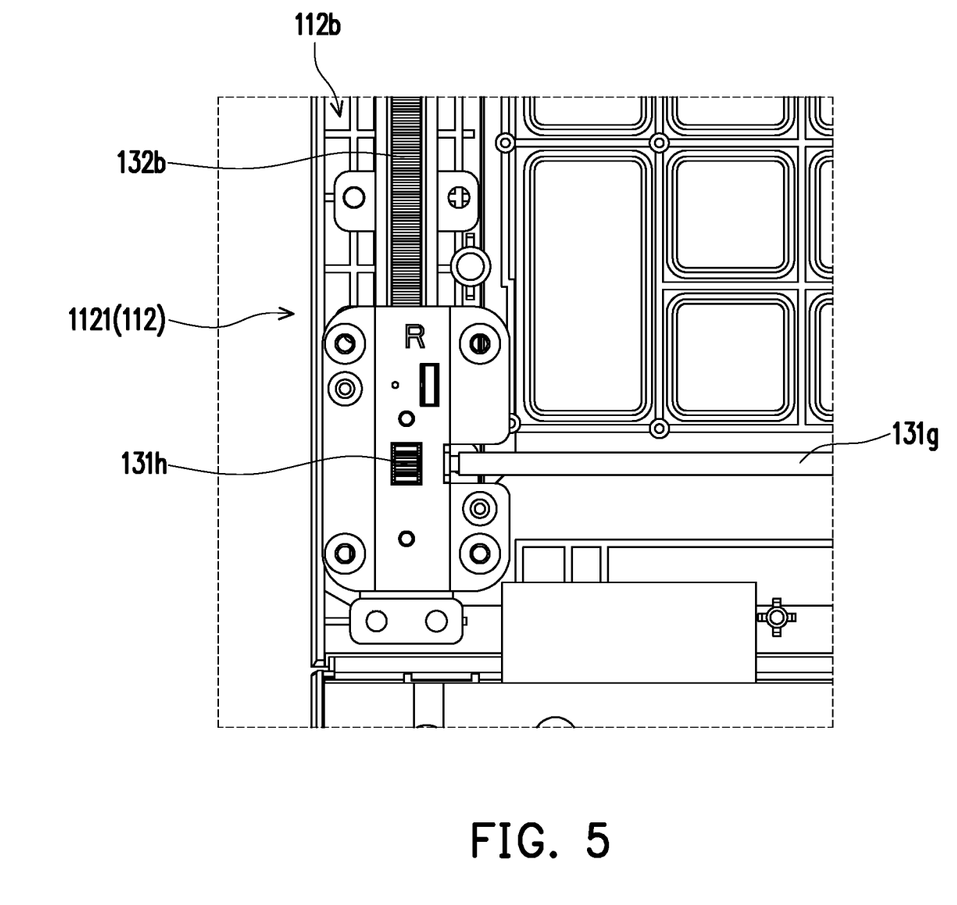

FIG. 1 is a schematic view of a portable electronic device in a first operation mode according to one embodiment of the disclosure. FIG. 2 is a schematic view of the portable electronic device in a second operation mode according to one embodiment of the disclosure. FIG. 3 is a schematic bottom view of an input module and a sliding mechanism in FIG. 1. FIG. 4 and FIG. 5 are schematic partial enlarged views of regions R1 and R2 in FIG. 3. Referring to FIG. 1 to FIG. 3, in the present embodiment, the portable electronic device 100 may be a notebook computer. The portable electronic device 100 includes a first body 110 and a second body 120 which are pivotally connected to each other, and the first body 110 and the second body 120 as shown in FIG. 1 and FIG. 2 are in an unfolded state. The first body 110 may have functions such as logical operation, information processing, information storage and signal control, while the second body 120 may have a display function. On the other hand, the portable electronic device 100 is selectively matched with an external display 200 so that a display frame is projected to the external display 200.

Further, the first body 110 includes a base 111 and an input module 112. The second body 120 is pivotally connected to the base 111, and the input module 112 is slidably disposed on the base 111. In order to improve the integration degree of the mechanism and reduce the thickness of the first body 110, the base 111 is provided with a sliding chute 111a to accommodate the input module 112. On the other hand, the inner wall surface in the sliding chute 111a is provided with a snap groove 111b close to a position where the base 111 is pivotally connected to the second body 120, while the side, facing the snap groove 111b, of the input module 112 is provided with a snap hook 112a. The snap hook 112a is snapped in the snap groove 111b in the first operation mode as shown in FIG. 1, so that the input module 112 is prevented from arbitrarily sliding relative to the base 111.

Continuing to refer to FIG. 1 to FIG. 4, the portable electronic device 100 further includes a sliding mechanism 130, configured to drive the input module 112 to slide relative to the base 111. It can be understood that the sliding mechanism 130 needs to be disposed between the input module 112 and the base 111 to make the sliding mechanism 130 drive the input module 112 to slide relative to the base 111. In detail, the sliding mechanism 130 includes a power output assembly 131 and a rack 132a. The power output assembly 131 is mounted at the base 111 and the rack 132a is mounted at a bottom surface 112b facing the base 111 in the input module 112. The power output assembly 131 is used for providing power for the input module 112 to slide relative to the base 111 and the power output assembly 131 is mechanically coupled to the rack 132a.

In other words, the position of the input module 112 of the portable electronic device 100 on the base 111 can be automatically adjusted so that different operation modes are provided for a user. Therefore, the portable electronic device 100 features favorable operational flexibility. For example, the user can control the power output assembly 131 to output power by only inputting a corresponding operation instruction, so that the input module 112 is driven to automatically slide relative to the base 111, without manually dragging or pushing the input module 112. Therefore, for the user, the portable electronic device 100 exhibits favorable operational flexibility. In addition, a heat radiating part 111c located in the sliding chute 111a of the base 111 is covered by the input module 112 when the portable electronic device 100 is in the first operation mode as shown in FIG. 1, and the input module 112 slides away from the heat radiating part 111c to expose the heat radiating part 111c to the outside after the portable electronic device 100 is switched to the second operation mode as shown in FIG. 2, so that the heat radiating efficiency is increased.

In the present embodiment, the input module 112 includes a first operation block 1121 and a second operation block 1123, and the rack 132a is mounted at the first operation block 1121. On the other hand, the first operation block 1121 includes a keyboard assembly 1122, and the second operation block 1123 includes a touch pad 1124. Both the first operation block 1121 and the second operation block 1123 are located on the base 111 when the portable electronic device 100 is in the first operation mode as shown in FIG. 1. After the portable electronic device 100 is switched to the second operation mode as shown in FIG. 2, the second operation block 1123 slides out of the base 111, while the first operation block 1121 is still located on the base 111. For example, the first operation block 1121 and the second operation block 1123 are pivotally connected to each other, the second operation block 1123 can rotate relative to the first operation block 1121 after the second operation block 1123 slides out of the base 111, so that the touch pad 1124 is inclined to a desktop, and furthermore, the use convenience is improved for the user.

It is particularly noted that when the portable electronic device 100 is in the second operation mode as shown in FIG. 2, even if the second body 120 covers the first body 110, the second operation block 1123 sliding out of the base 111 is still exposed to the outside so as to be operated by the user, for example, controlling the external display 200 by the touch pad 1124.

Referring to FIG. 3 to FIG. 5, in the present embodiment, the power output assembly 131 includes a motor 131a, a first belt pulley 131b, a belt 131c, a second belt pulley 131d and a first gear 131e. The motor 131a may be a stepping motor, and the first belt pulley 131b is mechanically coupled to the motor 131a. The first belt pulley 131b is mechanically coupled to the second belt pulley 131d by the belt 131c. The second belt pulley 131d is mechanically coupled to the first gear 131e, and the first gear 131e is mechanically coupled to the rack 132a. When the motor 131a runs, the motor 131a drives the first belt pulley 131b to rotate, and the first belt pulley 131b drives the belt 131c to run, so that the belt 131c drives the second belt pulley 131d to rotate. The first gear 131e and the second belt pulley 131d synchronously rotate, so that the rack 132a is driven by the first gear 131e to slide. On the other hand, the power output assembly 131 further includes a driving rod 131f, and the second belt pulley 131d and the first gear 131e are mounted at two ends of the driving rod 131f. The driving rod 131f is driven by the second belt pulley 131d to rotate so as to synchronously drive the first gear 131e to rotate.

In order to improve the stability of the sliding of the input module 112 relative to the base 111, the other rack 132b is mounted at the bottom surface 112b facing the base 111 in the input module 112, the rack 132b is parallel to the rack 132a, and the rack 132a and the rack 132b are symmetrically mounted at the input module 112. The power output assembly 131 further includes an extension rod 131g and a second gear 131h. The extension rod 131g is connected to the driving rod 131f, and the extension rod 131g and the driving rod 131f are coaxially disposed. The driving rod 131f is driven by the second belt pulley 131d to rotate so as to synchronously drive the extension rod 131g to rotate. In detail, the second gear 131h is mounted at the end, far away from the second belt pulley 131d, of the extension rod 131g, and the second belt pulley 131d is located between the first gear 131e and the second gear 131h. The first gear 131e is mechanically coupled to the rack 132a, the second gear 131h is mechanically coupled to the rack 132b, and therefore, when the extension rod 131g and the driving rod 131f synchronously rotate, the rack 132a is driven by the first gear 131e to slide, the rack 132b is driven by the second gear 131h to slide, and the rack 132a and the rack 132b synchronously slide.

Figure 6:
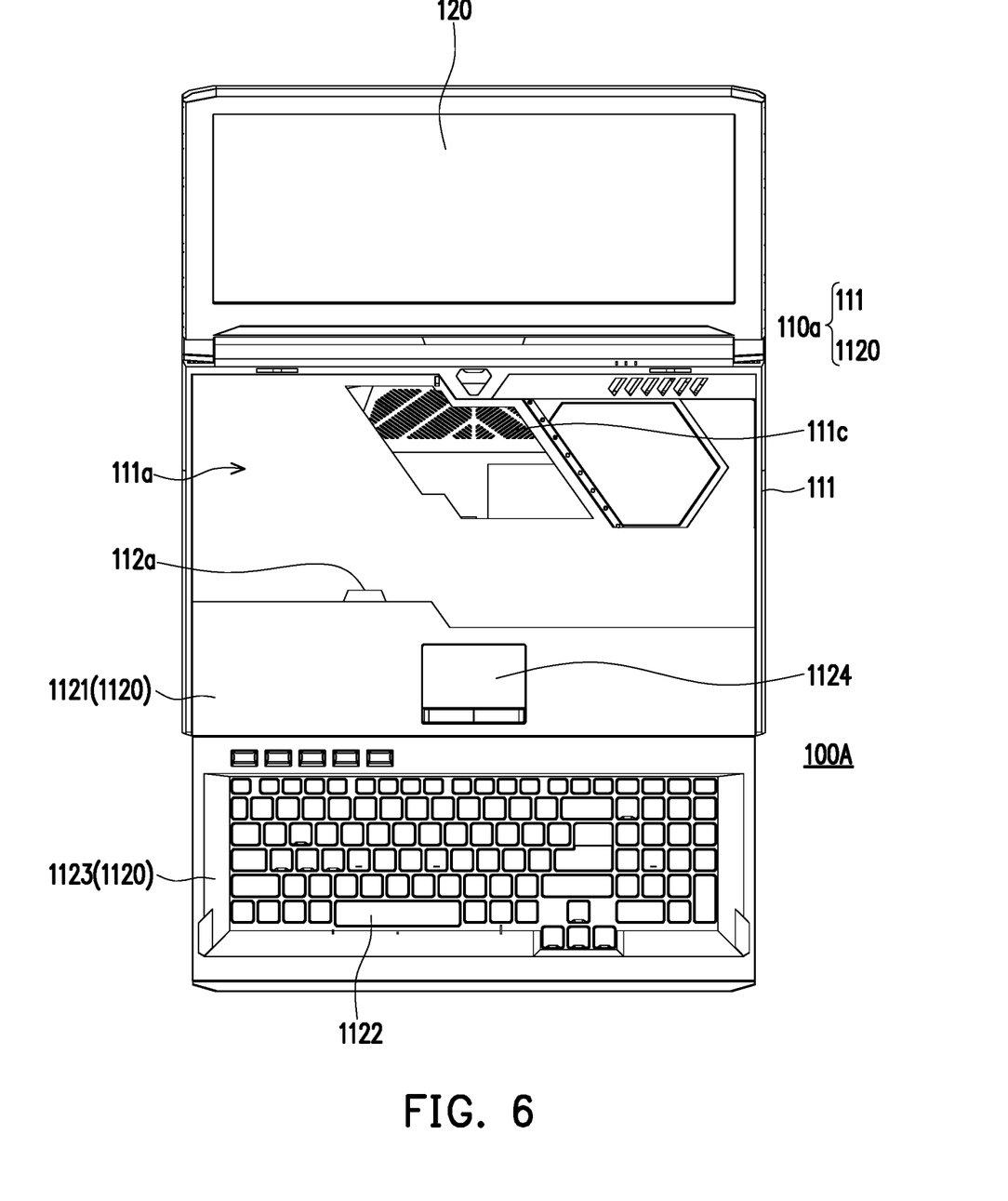
FIG. 6 is a schematic top view of a portable electronic device in the second operation mode according to another embodiment of the disclosure.

FIG. 6 is a schematic top view of a portable electronic device in a second operation mode according to another embodiment of the disclosure. Referring to FIG. 6, the portable electronic device 100A in the present embodiment uses the completely same sliding mechanism as that of the portable electronic device 100 in the former embodiment, and the difference lies in the configuration of the input module. Specifically, in the present embodiment, the first operation block 1121 of the input module 1120 includes the touch pad 1124, and the second operation block 1123 includes the keyboard assembly 1122. Therefore, the keyboard assembly 1122 slides out of the base 111 when the portable electronic device 100A is in the second operation mode. It is particularly noted that even if the second body 120 covers the first body 110, the second operation block 1123 sliding out of the base 111 is still exposed to the outside so as to be operated by the user, for example, controlling the external display 200 by the keyboard assembly 1122 (see FIG. 2).

Based on the above, the position of the input module of the portable electronic device provided by the disclosure on the base can be automatically adjusted so that different operation modes are provided for the user. Therefore, the portable electronic device provided by the disclosure exhibits favorable operational flexibility. In detail, the input module can slide on the base by virtue of the sliding mechanism. The sliding mechanism includes the power output assembly for providing power for the input module to slide relative to the base. For example, the user can control the power output assembly to output the power by only inputting the corresponding operation instruction, so that the input module is driven to automatically slide relative to the base, without manually dragging or pushing the input module. Therefore, for the user, the portable electronic device provided by the disclosure exhibits favorable operational flexibility.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A portable electronic device, comprising:
   a first body, comprising a base and an input module slidably disposed on the base;

a second body, pivotally connected to the base of the first body; and a sliding mechanism, comprising a power output assembly and a rack, wherein the power output assembly is mounted at the base, the rack is mounted at the input module, and the power output assembly is coupled to the rack, wherein the power output assembly comprises a motor, a first belt pulley, a belt, a second belt pulley, and a first gear, the first belt pulley is coupled to the motor, the first belt pulley is coupled to the second belt pulley through the belt, the second belt pulley is coupled to the first gear, and the first gear is coupled to the rack.

2. The portable electronic device according to claim 1, wherein the input module comprises a first operation block and a second operation block, and the rack is mounted at the first operation block.

3. The portable electronic device according to claim 2, wherein the first operation block comprises a keyboard assembly, and the second operation block comprises a touch pad.

4. The portable electronic device according to claim 2, wherein the first operation block comprises a touch pad, and the second operation block comprises a keyboard assembly.

5. The portable electronic device according to claim 2, wherein the second operation block is moved out of the base, and the first operation block is located on the base.

6. The portable electronic device according to claim 2, wherein the first operation block is moved out of the base, and the second operation block is located on the base.

7. The portable electronic device according to claim 1, wherein the power output assembly further comprises a driving rod, and the second belt pulley and the first gear are mounted at two ends of the driving rod.

8. The portable electronic device according to claim 7, wherein two racks are provided, and the two racks are symmetrically mounted at the input module, and the power output assembly further comprises an extension rod and a second gear, wherein the extension rod is connected to the driving rod, the second gear is mounted at one end of the extension rod away from the second belt pulley, the second belt pulley is located between the first gear and the second gear, the first gear is coupled to one of the two racks, and the second gear is coupled to the other one of the two racks.

9. The portable electronic device according to claim 8, wherein the extension rod and the driving rod are coaxially disposed.

* * * * *